United States Patent [19]

Rafert

[11] Patent Number: 4,553,456
[45] Date of Patent: Nov. 19, 1985

[54] WRENCH-HOLDING FIXTURE FOR VEHICULAR WHEELS

[76] Inventor: Don L. Rafert, R.F.D. #1, Box 24, Gresham, Nebr. 68367

[21] Appl. No.: 637,734

[22] Filed: Aug. 6, 1984

Related U.S. Application Data

[63] Continuation of Ser. No. 466,788, Mar. 25, 1983, abandoned.

[51] Int. Cl.⁴ ............................................. B25B 29/00
[52] U.S. Cl. ..................................................... 81/462
[58] Field of Search ..................... 81/53 R, 180 R, 462

[56] References Cited

U.S. PATENT DOCUMENTS

| | | | |
|---|---|---|---|
| 2,447,919 | 8/1948 | Teigen | 81/53 R |
| 2,761,340 | 9/1956 | Harrington | 81/53 R |
| 3,262,341 | 7/1966 | Cline et al. | 81/180 R |
| 3,577,818 | 5/1971 | Cramer et al. | 81/180 R |

*Primary Examiner*—James G. Smith
*Attorney, Agent, or Firm*—George R. Nimmer

[57] ABSTRACT

For uprightly attached vehicular wheels, the horizontal wheel-depth is so large that two workmen are required to remove and re-install the bolts attaching the wheel to the axle assembly. The novel wrench-holding fixture herein, which is removably installed vertically alongside the wheel well, eliminates the need for that secondary workman heretofore employed for holding the elongate bolt wrench parallel to the wheel geometric-center. The wrench-holding fixture includes a vertically upright jig-plate having a plurality of strategically positioned and readily accessible downwardly extending slots terminating as wrench-resting shelves horizontally alignable with the several wheel bolt locations. Sturdy riser means (such as radiating bottomlegs) and a vertically radiating topleg components permit the fixture to be manually frictionally installed to the horizontally circular wheel ridge and in a condition wherein the jig-plate wrench-resting shelves are adapted to steadily maintain the elongate bolt wrench in horizontal condition for manipulation by a lever wielding unassisted workman. The wrench-holding fixture might include other optionally employable features ancillary to the construction, installation, and use of the wrench-holding fixture.

15 Claims, 6 Drawing Figures

WRENCH-HOLDING FIXTURE FOR VEHICULAR WHEELS

This is a continuation of application Ser. No. 06/466,788, filed Mar. 25, 1983 now abandoned.

BACKGROUND OF THE INVENTION

Automobiles, trucks, farm tractors and equipment, and earthmoving equipment, as well as other overland vehicles, periodically require their vertically upright wheels to be removed from and re-installed to the axle assembly. As alluded to in drawing FIGS. 1 and 2, such typical vehicular wheels 100 (usually provided with pneumatic tires 105) are removably secured to the threaded bores 96 of axle assembly 95 with a plurality of threaded bolts 86 passing horizontal through matching wheel apertures 106 of wheel vertical plate 104. The bores 96 and matching wheel apertures 106 are spaced a constant bore-radius AR from the axle and wheel transversely extending horizontally geometric-center 99 and at equal angular intervals thereabout. For example for the ten bores 96 and the ten matching apertures 106 chosen for depiction in FIGS. 1 and 2, the angular spacing is 36°. Extending horizontally and transversely inwardly from the tire-engaging wheel flange 101 is a circular ridge 102 spaced a constant nominal ridge-radius RR from axle and wheel geometric-center 99. The horizontal and transversely inward well-depth distance TD from flange 101 to apertured wheel plate 104 is relatively small for personal automobiles whereby a lone workman utilizing a small "tire-iron" can easily remove and re-install the bolts 86. However, in the case of farm tractors and other large vehicles, the wheel-depth TD commonly exceeds eighteen inches whereby two workmen are required to remove and re-install the bolts 86. Specifically, a secondary workman (indicated by phantom line M2) is required to maintain a bolt-engaging socket wrench 110 parallel to geometric-center 99, while the primary workman (indicated by phantom line M1) is required for wielding elongate lever 120 engaged (at 111 with the bolt wrench 110.

OBJECT OF THE INVENTION

It is the general objective of the present invention to provide a method and ancillary fixture enabling a lone unassisted workman to remove and re-install the threaded bolts for a vehicular wheel having a considerable wheel-depth. Though this single workman objective is important for cost-conscious sommercial operations, it is also important for servicing farm tractors and the like at oneman farms or other geographically isolated servicing site.

Ancillar general objectives include providing method and attendant fixture that is relatively inexpensive to manufacture for various radii and angular spacing of wheel bolt apertures, sturdy and reliable in operation, easy to use without damage to the vehicle wheel, and able to accommodate fluctuations in nominal wheel radius and more than one nominal wheel radius.

SUMMARY OF THE INVENTION

With the above and other objects and advantages in view, which will become more apparent as this description proceeds, the present invention describes usage of a novel wrench-holding fixture (10) comprising a vertically upright annular jig-plate (20) installable transversely outwardly from the wheel bolt apertures (106) and including a plural-number of strategically positioned and wrench receiving downward slots(20) terminating as wrench-resting shelves (25W) respectively horizontally alignable with the wheel bolt locations (106), sturdy riser means (such as bottomless 60) and a radiating topleg 70 components removably securely install the fixture at the circular wheel ridge (102), and together with other desireable features which will be explained in detail as this description proceeds.

BRIEF DESCRIPTION OF THE DRAWINGS

In the drawing, wherein like characters refer to like parts in the several views, and in which.

SPECIFICATION

Figure 3:
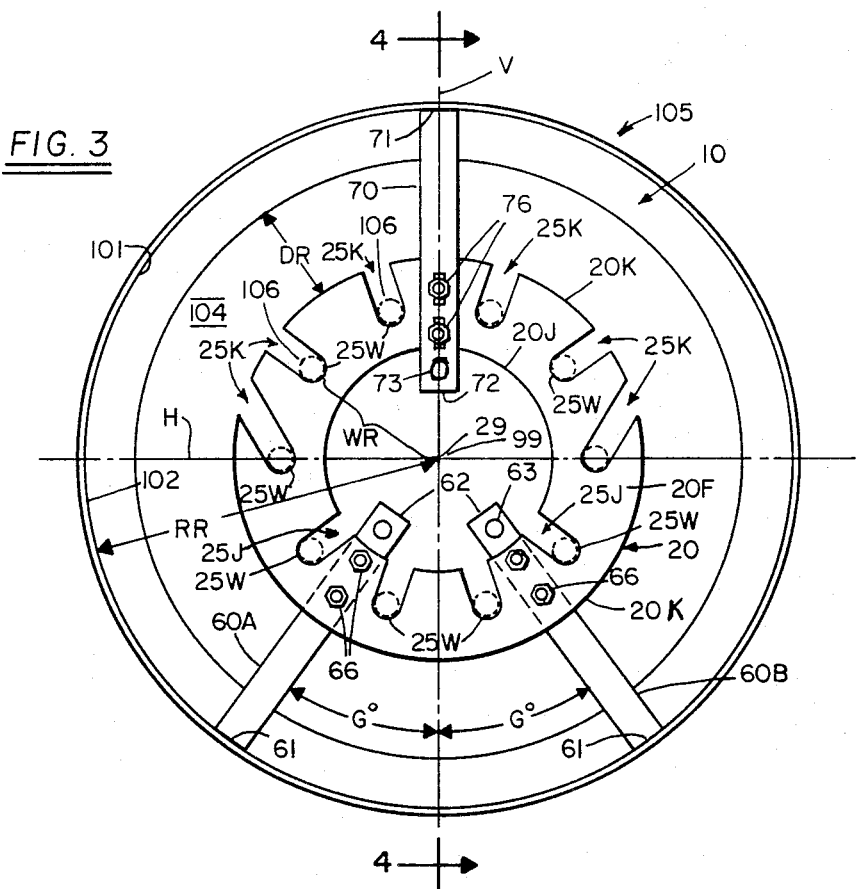
FIG. 3 is an outward side elevational view of a representative embodiment of the wrench-holding fixture concept of the present invention shown in removably installed condition to the typical wheel environment of FIGS. 1 and 2.
Figure 1:
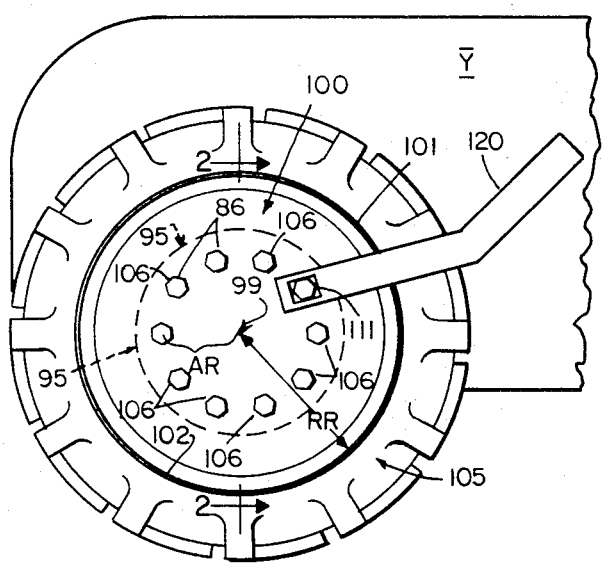
FIG. 1 is a side elevational view of a conventional vehicular wheel and showing the use of socket wrench and lever for removing and re-installing the wheel bolts.
Figures 5A, 5B:
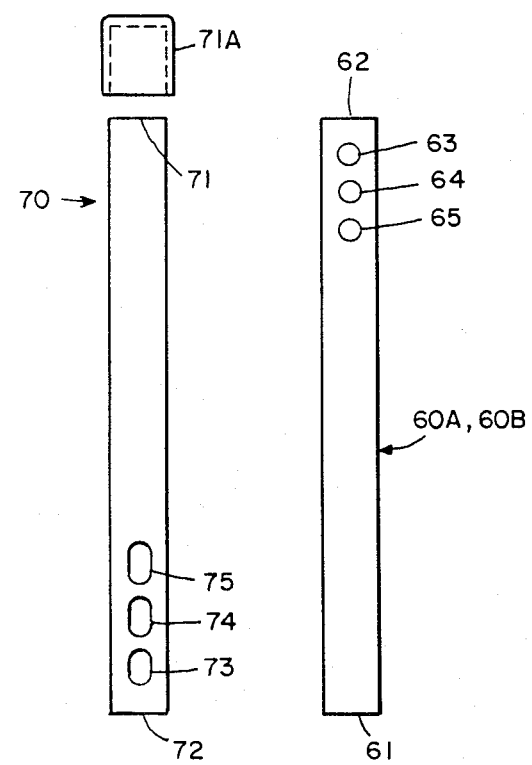
FIGS. 5A and 5B are detail views of the bottomlegs and topleg components for the representative embodiment of FIGS. 3 and 4.
Figure 2:
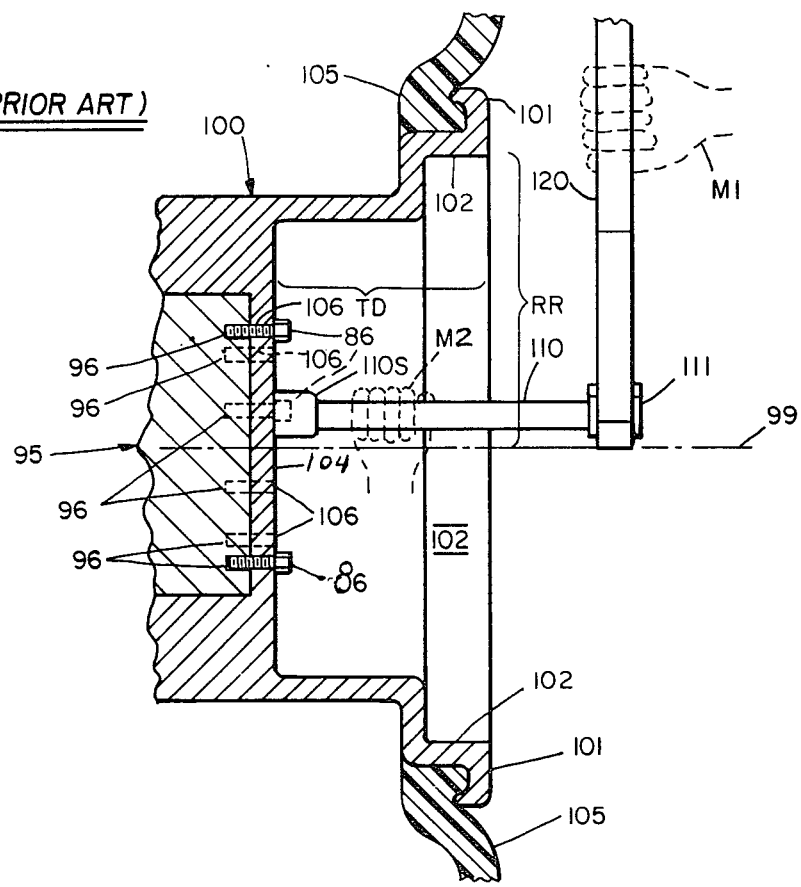
FIG. 2 is a transversely extending sectional elevational view taken along line 2—2 of FIG. 1 and showing with phantom lines the two workmen requirement of the prior art.

As seen in drawing FIGS. 3, 4, 5A and 5B, representative (though non-limiting) embodiment 10 of the wrench-holding fixture of the present invention generally comprises a vertically upright annular jig-plate 20 that is removably installable to a vertically upright vehicular wheel 100 in a condition generally parallel to wheel vertical plate 104 and nearer to wheel flange 101 than to said wheel plate. Jig-plate 20 contains a plural-number (one for each wheel aperture 106) of downwardly extending slots 25 respectively terminating as a lower-end wrench-resting shelf 25W and which shelves 25W are spaced at equal angular intervals about wheel geometric-center 99 and at said bore-radius (AR, WR) from said central reference-point (99, 29). Thus, the number and spacing of wrench-resting shelves 25W is related to that for wheel apertures 106, Accordingly, a bolt wrench (110) might be supported upon the respective shelves 25W and thereby dispensing with the services of secondary workman M2. The fixture's wheel installation means is aptly rigidly associated with annular jig-plate 20, such as comprising two convergent bottomlegs (serving as a sturdy riser means) and a radiating topleg 70.

The annular jig-plate embodiment depicted as 20 takes the form of an appropriately contoured plate having planar outward surface 20F and planar inward surface 20E and intersected in the FIG. 3 elevational view by intersecting upright planes including horizontal plane H and vertical plane V. In FIG. 3, planes H and V intersect at a transversely extending horizontal line defining the jig-plate central reference-point 29 and which point is surrounded by jig-plate annular-periphery 20J. In the fixture installed condition, reference-point 29 will be in substantial horizontal alignment with wheel geometric-center 99. Jig-plate outer-periphery 20K, which surrounds said annular-periphery 20J, is surrounded by spatially removed (DR) wheel flange 101.

Of said plural-number of downwardly extending jig-plate slots 25, a plurality are as upper-slots 25K extending downwardly from portions of jig-plate outer-periphery 20K located above horizontal plane H. The remaining plural-number of said slots 25 are as lower-slots 25J extending downwardly from portions of the smaller annular-periphery 20J located below plane H. The lower-end of each slot 25, which provides the wrench-resting shelf 25W, is preferably of circular arc configuration for cross-sectional circular wrenches 110. For the typically depicted vehicular wheel 100 having ten apertures 106, FIG. 3 shows ten as the plural-number of jig-plate downwardly extending slots 25 (six as upper-slots 25K and four as lower-slots 25J) to provide ten equally spaced wrench-resting shelves 25W respectively horizontally alignable with the ten similarly spaced wheel apertures 106. The precise plural-number of downwardly extending slots 25 (collectively arrayed as equally spaced shelves 25W) is, of course, selected according to the number and spacing of the apertures (106) for the objective vehicular wheel. According to this general rule, and as applied to another object wheel having nine apertures 106, the plural-number of slot-type wrench-resting shelves 25W for the jig-plate would be nine at 40° angular intervals and at the appropriate constant bore-radius AR.

Below said horizontal reference plane H and said reference-point (29, 99), there are sturdy riser means (e.g. 60) including lower-base means (e.g. 61) located on both sides of said vertical reference plane V and being spaced substantially said ridge-radius RR from said reference-point (29, 99). Thus, when the lower-base means (e.g. 61) is at downwardly resting condition upon the horizontally extending circular wheel ridge 102, the sturdy riser means has the inherent tendency to horizontally align jig-plate reference-point 29 with wheel geometric-center 99. Accordingly, the circularly arrayed wrench-resting shelves 25W are readily horizontally alignable with the circularly arrayed wheel apertures 106. In the drawing, the sturdy riser means takes the representative form of a pair of metallic bottomlegs shown as 60 in FIG. 5A and having upper-end 62 and base-end 61, the latter providing a lower-base means. Bottomlegs 60A and 60B are upwardly convergent toward reference-point 29 and are laterally separated at selectable angle G° from reference-point 29, the angular value of G° being preferably within the range of 15° to 45° to provide good sturdiness for the riser means(-60A,60B). Rigid association of the respective bottomlegs 60A and 60B to jig-plate 20 is herein depicted as a pair of bolts 66 passing through selected bottomleg apertures (63, 64, 65) and through the jig-plate.

Above horizontal reference plane H and attached to the jig-plate (20) is an upright topleg (e.g. 70) having a free-edge spaced substantially said ridge-radius RR from jig-plate reference-point 29 and a lengthy distance DR from the jig-plate outer-periphery (20K). The vertically extending topleg 70, which is laterally narrower than the riser means (60) therebelow, provides for the fixture 10 an upperterminus free-edge 71 that is frictionally engageable with the horizontally extending wheel ridge 102 above geometric-center 99. Thus, this topleg frictional engagement cooperates with the lower-base means (61) to maintain the jig-plate wrench-resting shelves 25W horizontally aligned with the circularly arrayed wheel bores 106. The topleg of FIGS. 3, 4, and 5B might be formed of springy metal and having a said free-end 71, a second-end 72, and apertures (e.g. 73, 74, 75) which are preferably vertically elongated. Attachment to jig-plate 20 might be accomplished with a pair of bolts 76 passing through a pair of topleg apertures (e.g. 74, 75) and through the jig-plate. Obviously, no portion of the sturdy riser means (e.g. 60) nor the topleg (e.g. 70) should physically obstruct any portion of the downwardly extending jig-plate slots 25. In a related vein, topleg second-end 72 is located above all the lower-slots 25J and above the bottomlegs upper-ends 62 whereby the topleg and the bottomlegs do not interfere with the downward placing of a horizontal wrench (110) into said annular-periphery slots 25J. Also, topleg free-end 71 is spaced a lengthy distance away from outer-periphery whereby gap OR ensuring that there will be no interference with the downward placing of a horizontal wrench into the outer-periphery slots 25K.

Figure 4:
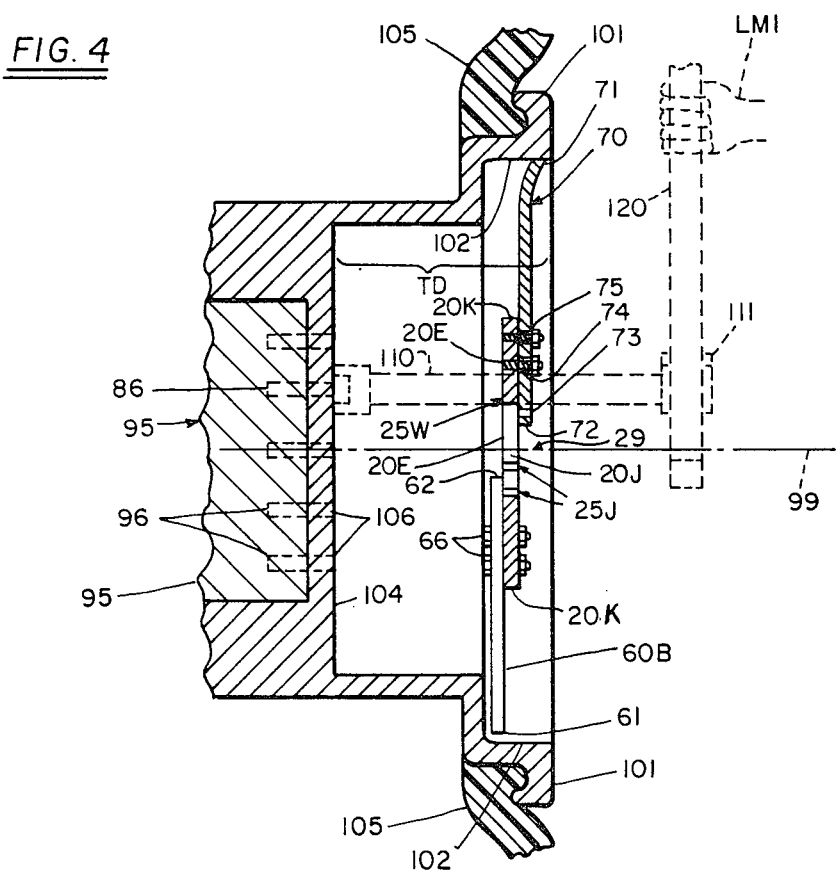
FIG. 4 is a transversely extending sectional elevational view taken along line 4—4 of FIG. 3, phantom lines showing the bolt-engaging wrench supported by the fixture and the wieldable wrench lever.

Although having already been alluded to, operation of wrench-holding fixture representative embodiment 10 might be summarized as follows. The lone workman (e.g. LM1) assigned to the task of removing and re-installing the bolts 86 attaching wheel 100 to axle 95, sets the fixture lower-base means (61) downwardly upon circular wheel ridge 102 so that said lower-base means stradles the vertical plane (V) extending along wheel geometric-center 99. The workman then manually adjusts fixture 10 about its reference-point (29, 99) until he visually sights wrench-resting shelves 25W in horizontal alignment with wheel aperture locations (86, 106) whereby the entire circular array of shelves 25W is coincidentally aligned with the entire circular array of wheel apertures 106. Then, the workman moves topleg 70 firmly toward wheel 100 until its free-end 71 frictionally engages the upper portion of circular wheel ridge 102. Thus, as indicated in FIG. 4, the removably frictionally installed fixture 10 dispenses with the need for the secondary workman M2. In other words, the array of wrench-resting shelves 25W suffices to hold the socketed wrench 110 in serial horizontal conditions while the unassisted primary workman LM1 manipulates lever 120. Inasmuch as operation of lever 120 places a great deal of downward force upon the serially employed shelves 25W, metallic or other sturdy material is required for the jig-plate (20) and for the riser means(60A, 60B). Though drawing FIGS. 3 and 4 depict the bottomlegs 60 and the topleg 70 abutting along opposite surfaces of jig-plate 20, all legs might be desireably attached to the same surface (20E or 20F) of the jig-plate.

Inasmuch as the lower-base means (e.g. 61) and the topleg free-end (71) are respectively spaced the same said ridge-radius value RR from jig-plate central reference-point 29, theoretically a fixture designed within such constant RR values parameters will precisely fit any circular wheel having a ridge-radius of the same nominal RR value. However, wheels actually encountered might deviate a fractional-inch from its nominal ridge-radius value, and because of such minor deviations the fixture might include minor-adjustment means, such as (but not limited to):

(a) providing one or more of the fixture primary components (jig-plate, riser means, and topleg) from manually deflectable springy material. For example, as alluded to in FIG. 3, topleg 70 is indicated as being provided of manually deflectable springy metallic material;

b. providing the topleg apertures (73, 74, 75) of elongated shape, whereby the topleg free-edge 71 (upon temporary loosening of bolts 76) is of fractional inch adjustability with respect to jig-plate outer-periphery 20K;

c. providing relatively soft removable caps (e.g. 71A) for the ridge-engaging ends of legs 60A, 60B, and 70. Such removably mounted end caps 71A have the further incidental advantage of preventing marring of the wheel ridge (102).

There are situations wherein the jig-plate wrench-resting shelves 25W are appropriately spatially arrayed for horizontal alignment with circularly arrayed wheel apertures 106, but the wheel radius nominal value RR might vary an inch or more. As a typical example, tractor vehicle wheels having nominal radii values of nineteen and twenty-one inches can be installed on the same circular array of axle bores 96. Because of this possible nominal value variation for the same axle, the fixture might include major-adjustment means, such as (but not limited to) attaching attaching each leg (60, 70) to the jig-plate with two bolts (66, 76) passing through two of three leg apertures. For example, the bottomleg apertures 63–65 and the topleg apertures 73–75 might be spaced at two-inch intervals. Thus, if two bolts 66 pass through bottomleg apertures 65 and 64, and two bolts 76 pass through topleg apertures 75 and 74, the fixture will accommodate a wheel having a ridge-radius nominal value RR of, say, nineteen inches. But when the same two bolts 66 pass instead through bottomlegs apertures 63 and 64, and the same two bolts 76 pass through topleg apertures 73 and 74, the fixture will accommodate a wheel having a larger nominal value RR, say twenty-one inches.

Inasmuch as prior art practice advocates sequential manipulation of diametrically opposed wheel bolts 86, there can be numerically sequential indicator means carried by the jig-plate external surface 20F to indicate an appropriate numerical order of utilization for the wrench-resting shelves 25W. For example, such indicia may be as sequential numbers or alphabetic characters inscribed upon jig-plate external surface 20F alongside the respective shelves 25W.

From the foregoing, the construction and operation of the wrench-holding fixture for vehicular wheels will be readily understood and further explanation is believed to be unnecessary. However, since numerous modifications and changes will readily occur to those skilled in the art, it is not desired to limit the invention to the exact constructions shown and described, and accordingly, further modifications and equivalents may be resorted to, as encompassed by the scope of the appended claims.

I claim:

1. For use in removable combination with a vertically upright vehicular wheel having an inwardly horizontally extending circular ridge spaced a finite ridge-radius from the wheel geometric-center, and said vehicular wheel being provided with a plural-number of horizontal apertures in a circular array spaced a constant bore-radius from said geometric-center and at equal angular intervals thereabout, a wrench-holding fixture comprising:

(A) a vertically upright annular jig-plate having a central reference-point horizontally alignable with said geometric-center and also having a larger outer-periphery surrounding a smaller annular-periphery and said reference-point, that part of the outer-periphery located above a horizontal plane passing through the jig-plate reference-point being spaced less than said ridge-radius from said reference-point, said jig-plate being provided with a plural-number of downwardly extending slots, said downwardly extending slots being wholly linearly extending along the length thereof and terminating as a lower-end of circular arc configuration, a plurality of said slots being as upper-slots extending wholly linearly downwardly from portions of the outer-periphery located above said horizontal plane, another plurality of said slots being as lower-slots extending wholly linearly downwardly from portions of the annular-periphery located below said horizontal plane, the majority of said downwardly extending slots being in lineraly extending radial relationship to the jig-plate central reference-point, and each downwardly extending slot circular arc lower-end being spaced substantially said bore-radius from the jig-plate reference-point and providing a horizontal wrench-resting shelf, thereby providing a plural number of circular arc wrench-resting shelves equal to the plural-number of lineal slots and spaced at equal angular intervals about said reference-point;

(B) sturdy riser means extending rigidly downwardly from the jig-plate and located wholly below the reference horizontal plane thereof, said riser means having a lower-base means located on both lateral sides of a vertical plane passing perpendicularly through the jig-plate reference-point and being adapted to rest downwardly against the circular wheel ridge, said lower-base means being spaced substantially said ridge-radius from the jig-plate reference-point whereby the riser means at downwardly resting condition has the tendency to horizontally align the circularly arrayed wrench-resting shelves with the circularly arrayed wheel apertures; and (C) an upright topleg attached to the jig-plate and located above said horizontal plane and riser means, said topleg being laterally narrower than the riser means lower-base means and having a free-edge spaced substantially said ridge-radius from the jig-plate reference-point, said topleg free-edge providing the fixture upper terminus and being frictionally engageable with the wheel circular ridge whereby the topleg free-edge and the lower-base means together cooperatively maintain the jig-plate wrench-resting shelves horizontally aligned with the wheel apertures.

2. The wrench-holding fixture of claim 1 wherein the riser means comprises a pair of laterally separated and upwardly convergent bottomlegs attached to the jig-plate, each bottomleg terminating below the jig-plate as a base-end spaced substantially said ridge-radius from the jig-plate reference-point whereby said two laterally separated base-ends provide said lower-base means restable downwardly against the circular wheel ridge.

3. The fixture of claim 2 wherein the topleg is located wholly above all those slots that extend downwardly from the jig-plate annular-periphery, and wherein the bottomlegs are located wholly below the topleg whereby the topleg and bottomlegs do not interfere with the downward placing of a horizontal wrench into said annular-periphery slots.

4. The fixture of claim 3 wherein the bottomlegs are at lesser angles to said vertical plane than to the horizontal plane and at angles exceeding 15° with respect to the vertical plane to promote installation rigidity for the fixture during wrench usage.

5. The fixture of claim 4 wherein there is an equal number of downwardly extending slots located on both sides of said vertical plane, and wherein there are at least two downwardly extending slots located between said bottomlegs.

6. The fixture of claim 3 wherein the topleg and the bottomleg are provided of metallic structural material, and wherein the topleg at the free-edge and the bottomlegs at the base-ends are provided with relatively soft non-metallic caps.

7. The fixture of claim 6 wherein at least the topleg is provided of springy metallic material.

8. The wrench-holding fixture of claim 1 wherein there are minor-adjustment means to ensure that the fixture will conform to fractional-inch irregularities for the circular wheel ridge actually encountered by the fixture base-end means and topleg free-edge.

9. The fixture of claim 8 wherein one or more portions of the fixture are provided of manually deflectable springy metallic material.

10. The fixture of claim 8 wherein the topleg free-edge is of radially adjustable position with respect to the jig-plate outer-periphery.

11. The wrench-holding fixture of claim 2 wherein there are major-adjustment means to ensure that the fixture at topleg free-edge and at the base-means will conform to wheels of more than one nominal ridge-radius.

12. The fixture of claim 11 wherein the topleg and the bottomlegs are of adjustable lengths outwardly beyond the jig-plate outer-periphery.

13. The fixture of claim 1 wherein there is an equal number of wrench-resting shelves located on both sides of said vertical plane.

14. In removable combination with a vertically upright vehicular wheel having an inwardly horizontally extending circular ridge spaced a finite ridge-radius from the wheel geometric-center, and said vehicular wheel being provided with a finite plural-number of horizontal apertures in a circular array spaced a constant bore-radius from said geometric-center and at equal angular intervals thereabout, a frictionally engaged upright wrench-holding fixture comprising:

(A) a vertically upright annular jig-plate having a larger outer-periphery surrounding a smaller annular-periphery, said jig-plate being provided with a finite plural-number of downwardly extending slots, every one of said slots being wholly downwardly linearly extending throughout and terminating as a lower-end of circular arc configuration, a plurality of said slots being as upper-slots extending wholly linearly downwardly from upper portions of the jig-plate outer-periphery, another plurality of said slots being as lower-slots extending wholly linearly downwardly from lower portions of the jig-plate annular-periphery, the vast majority of said downwardly extending slots being in linearly extending radial relationship to the jig-plate central reference-point, and each downwardly extending slot circular arc lower-end being spaced substantially said bore-radius from the wheel geometric-center and providing a horizontal wrench-resting shelf, thereby providing a finite plural-number of wrench-resting shelves equal to the plural-number of lineal slots and spaced at equal angular intervals about said geometric-center;

(B) sturdy riser means extending rigidly downwardly from the jig-plate and including lower-base means resting downwardly against the circular wheel ridge, said lower-base means being spaced substantially said ridge-radius from the wheel geometric-center whereby the riser means horizontally aligns the circularly arrayed wrench-resting shelves with the circularly arrayed wheel apertures; and (C) an upright topleg attached to the jig-plate and located above said riser means, said topleg being laterally narrower than the riser means lower-base means and having a free-end spaced loftily above the jig-plate outer-periphery, said topleg free-end providing the fixture upper terminus and being frictionally engaged with the wheel circular ridge above the geometric-center thereof whereby the topleg and riser means together maintain the wrench-resting shelves horizontally aligned with the wheel apertures.

15. The combination of claim 14 wherein the riser means comprises a pair of laterally separated and upwardly convergent bottomlegs attached to the jig-plate, each bottomleg terminating as a lower base-end located at the circular wheel ridge below the wheel geometric-center; wherein the topleg is located above the bottomlegs and the lower-slots whereby the topleg does not interfere with the downward placing of a horizontal wrench into said annular-periphery lower-slots; and wherein the jig-plate outer-periphery above the wheel geometric-center is spaced away from the circular wheel ridge whereby said wheel ridge does not interfere with the downward placing of a horizontal wrench into said outer-periphery upper-slots.

* * * * *